United States Patent [19]
Shibata et al.

[11] Patent Number: 5,987,571
[45] Date of Patent: Nov. 16, 1999

[54] CACHE COHERENCY CONTROL METHOD AND MULTI-PROCESSOR SYSTEM USING THE SAME

[75] Inventors: Masabumi Shibata, Kawasaki; Atsushi Nakajima, Hadano; Shisei Fujiwara, Ebina, all of Japan

[73] Assignee: Hitachi, Ltd., Tokyo, Japan

[21] Appl. No.: 08/839,072

[22] Filed: Apr. 23, 1997

[30] Foreign Application Priority Data

Apr. 24, 1996 [JP] Japan ................................. 8-102827

[51] Int. Cl.⁶ .............................................. G06F 12/00
[52] U.S. Cl. ........................ 711/141; 711/137; 711/150; 711/152
[58] Field of Search ........................... 707/201; 711/143, 711/122, 146, 121, 144, 141, 137, 150, 152

[56] References Cited

U.S. PATENT DOCUMENTS

| | | | |
|---|---|---|---|
| 4,622,631 | 11/1986 | Frank et al. | 707/201 |
| 5,113,514 | 5/1992 | Albonesi et al. | 711/144 |
| 5,222,224 | 6/1993 | Flynn et al. | 711/144 |
| 5,226,144 | 7/1993 | Moriwaki et al. | 711/121 |
| 5,241,641 | 8/1993 | Iwasa et al. | 711/143 |
| 5,274,787 | 12/1993 | Hirano et al. | 711/143 |
| 5,557,769 | 9/1996 | Bailey et al. | 711/146 |

FOREIGN PATENT DOCUMENTS 6-64553 8/1994 Japan.

OTHER PUBLICATIONS

"Pentium Process or Architecture and Programming", Chapter 18, Intel Japan Company, Ltd.

*Primary Examiner*—John W. Cabeca
*Assistant Examiner*—Fred F. Tzeng
*Attorney, Agent, or Firm*—Antonelli, Terry, Stout & Kraus, LLP

[57] ABSTRACT

In a cache coherency control method of a multi-processor system comprising a plurality of cache systems of identical configuration-after "method", for quickly determining consistency of a data block designated by a cache coherency request issued by other cache system a multi-processor system using the same, systems have identical configuration and each of the cache systems includes a history table for storing an address included in an access request flowing over a shared bus and a history table control circuit. The history table control circuit determines whether an address of a received access request is stored in the history table, and when the address is stored in the history table, suppresses the operation of a cache control circuit for the access request, and alternatively when the address is not stored in the address table, conducts the operation of the cache control circuit for the access request.

20 Claims, 11 Drawing Sheets

FIG. 2

| REQUESTED OPERATION | STATE OF BLOCK OF REQUESTING CACHE BEFORE OPERATION | STATES OF BLOCKS OF OTHER CACHE BEFORE OPERATION | DATA TRANSFER OPERATION ON SHARED BUS | STATE OF BLOCK OF REQUESTING CACHE AFTER OPERATION | STATES OF BLOCKS OF OTHER CACHES AFTER OPERATION |
|---|---|---|---|---|---|
| READ REQUEST | Invalid | Invalid | MAIN MEMORY → REQUESTING CACHE | Shared | Invalid |
| | | Shared | MAIN MEMORY → REQUESTING CACHE | Shared | Shared |
| | | Exclusive | MAIN MEMORY → REQUESTING CACHE | Shared | Shared |
| | | Modified | MODIFIED CACHE → REQUESTING CACHE / MAINE MEMORY | Shared | Shared |
| | Shared | Invalid | — | Shared | Invalid |
| | | Shared | — | Shared | Shared |
| | Exclusive | Invalid | — | Exclusive | Invalid |
| | Modified | Invalid | — | Modified | Invalid |
| WRITE REQUEST | Invalid | Invalid | MAIN MEMORY → REQUESTING CACHE | Modified | Invalid |
| | | Shared | MAIN MEMORY → REQUESTING CACHE | Modified | Invalid |
| | | Exclusive | MAIN MEMORY → REQUESTING CACHE | Modified | Invalid |
| | | Modified | MODIFIED CACHE → REQUESTING CACHE / MAINE MEMORY | Modified | Invalid |
| | Shared | Invalid | MAIN MEMORY → REQUESTING CACHE | Modified | Invalid |
| | | Shared | MAIN MEMORY → REQUESTING CACHE | Modified | Invalid |
| | Exclusive | Invalid | — | Modified | Invalid |
| | Modified | Invalid | — | Modified | Invalid |

FIG. 3

| ISSUING CACHE | TRANSACTION TYPE | CTH REGISTRATION STATE | CTH OPERATION |
|---|---|---|---|
| OTHER CACHE | READ REQUEST | Miss | SEND TO CACHE TAG MEMORY S-HIT REGISTRATION OF BLOCK |
| | | S-Hit | NOTIFY SHARED TO ISSUING CACHE |
| | | I-Hit | NOTIFY INVALID TO ISSUING CACHE |
| | WRITE REQUEST | Miss/S-Hit | SEND TO CACHE TAG MEMORY I-HIT REGISTRATION OF BLOCK |
| | | I-Hit | NOTIFY INVALID TO ISSUING CACHE |
| OWN CACHE | READ REQUEST | Miss/S-Hit | — |
| | | I-Hit | SET BLOCK TO S-HIT |
| | WRITE REQUEST | Miss | — |
| | | S-Hit/I-Hit | SET BLOCK TO MISS |

FIG. 6

| ISSUING CACHE | TRANSACTION TYPE | CTH REGISTRATION STATE | CTH OPERATION |
|---|---|---|---|
| OTHER CACHE | READ REQUEST | Miss | SEND TO CACHE TAG MEMORY |
| | | Hit | NOTIFY INVALID TO ISSUING CACHE |
| | WRITE REQUEST | Miss | SEND TO CACHE TAG MEMORY HIT REGISTRATION OF BLOCK |
| | | Hit | NOTIFY INVALID TO ISSUING CACHE |
| OWN CACHE | READ REQUEST | Miss | — |
| | | Hit | SET BLOCK TO MISS |
| | WRITE REQUEST | Miss | — |
| | | Hit | SET BLOCK TO MISS |

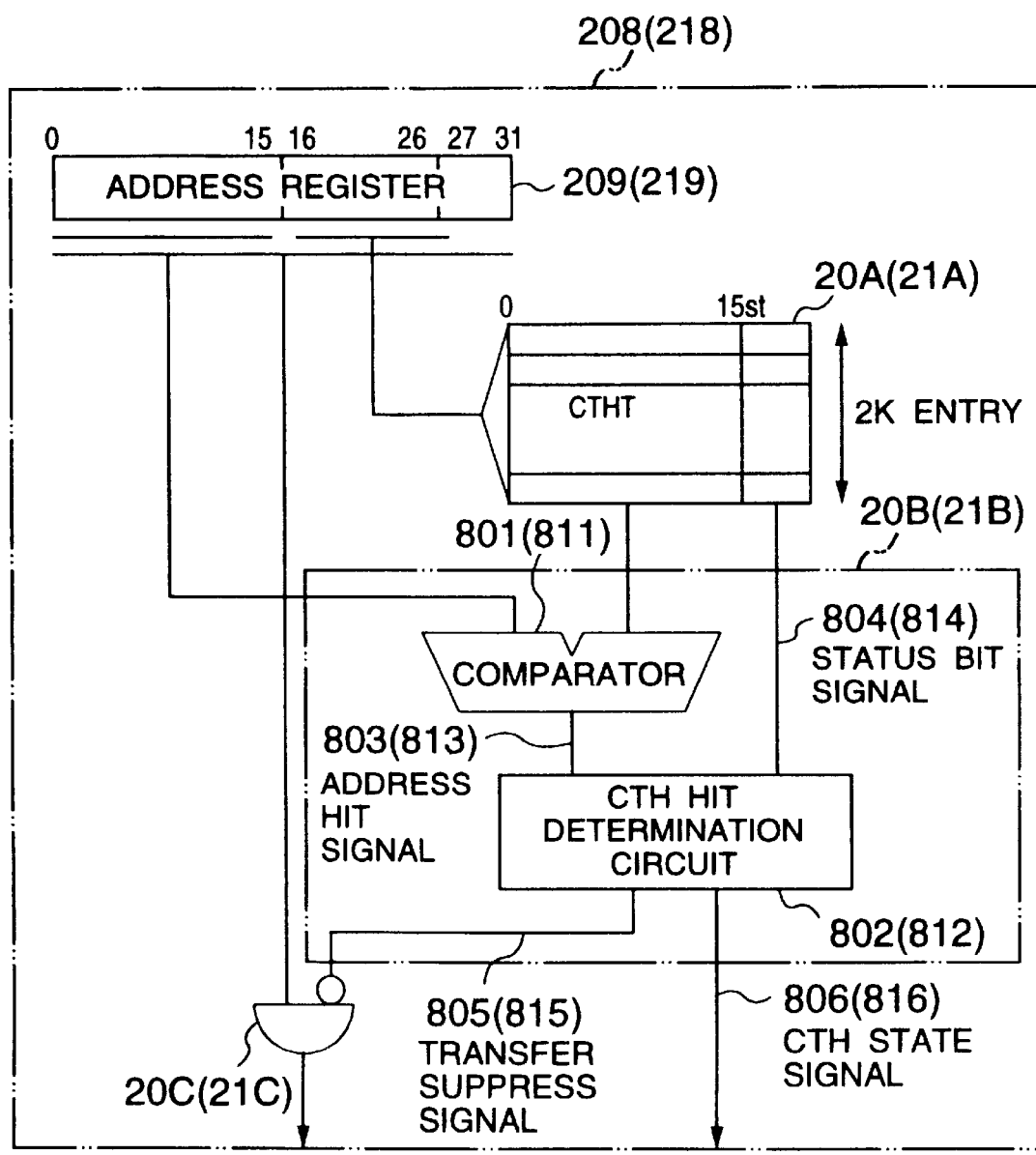

FIG. 5

| ISSUING CACHE | TRANSACTION TYPE | ADDRESS HIT SIGNAL | STATUS BIT | TRANSFER SUPPRESS SIGNAL | CTH STATE SIGNAL |
|---|---|---|---|---|---|
| OTHER CACHE | READ REQUEST | miss | — | 0 | Miss |
| | | hit | miss | 0 | Miss |
| | | hit | S-Hit | 1 | S-Hit |
| | | hit | I-Hit | 1 | I-Hit |
| | WRITE REQUEST | miss | — | 0 | Miss |
| | | hit | miss | 0 | Miss |
| | | hit | S-Hit | 0 | S-Hit |
| | | hit | I-Hit | 1 | I-Hit |
| OWN CACHE | READ REQUEST | miss | — | 0 | Miss |
| | | hit | miss | 0 | Miss |
| | | hit | S-Hit | 0 | S-Hit |
| | | hit | I-Hit | 0 | I-Hit |
| | WRITE REQUEST | miss | — | 0 | Miss |
| | | hit | miss | 0 | Miss |
| | | hit | S-Hit | 0 | S-Hit |
| | | hit | I-Hit | 0 | I-Hit |

FIG. 8

| REQUESTED OPERATION | STATE OF BLOCK OF REQUESTING CACHE BEFORE OPERATION | STATES OF BLOCKS OF OTHER CACHE BEFORE OPERATION | DATA TRANSFER OPERATION ON SHARED BUS | STATE OF BLOCK OF REQUESTING CACHE AFTER OPERATION | STATE OF BLOCK OF OTHER CACHE AFTER OPERATION |
|---|---|---|---|---|---|
| READ REQUEST | Invalid | Invalid | MAIN MEMORY → REQUESTING CACHE | Shared | Invalid |
| | | Shared | MAIN MEMORY → REQUESTING CACHE | Shared | Shared |
| | | Exclusive | MAIN MEMORY → REQUESTING CACHE | Shared | Shared |
| | | Modified | MODIFIED CACHE → REQUESTING CACHE / MAINE MEMORY | Shared | Shared |
| | Shared | Invalid | — | Shared | Invalid |
| | | Shared | — | Shared | Shared |
| | Exclusive | Invalid | — | Exclusive | Invalid |
| | Modified | Invalid | — | Modified | Invalid |
| READ REQUEST (2) | Invalid | Invalid | MAIN MEMORY → REQUESTING CACHE | Shared | Invalid |
| | | Shared | MAIN MEMORY → REQUESTING CACHE | Shared | Shared |
| | | Exclusive | MAIN MEMORY → REQUESTING CACHE | Shared | Shared |
| | | Modified | MODIFIED CACHE → REQUESTING CACHE / MAINE MEMORY | Exclusive | Invalid |
| | Shared | Invalid | — | Shared | Invalid |
| | | Shared | — | Shared | Shared |
| | Exclusive | Invalid | — | Exclusive | Invalid |
| | Modified | Invalid | — | Modified | Invalid |
| WRITE REQUEST | Invalid | Invalid | MAIN MEMORY → REQUESTING CACHE | Modified | Invalid |
| | | Shared | MAIN MEMORY → REQUESTING CACHE | Modified | Invalid |
| | | Exclusive | MAIN MEMORY → REQUESTING CACHE | Modified | Invalid |
| | | Modified | MODIFIED CACHE → REQUESTING CACHE / MAINE MEMORY | Modified | Invalid |
| | Shared | Invalid | MAIN MEMORY → REQUESTING CACHE | Modified | Invalid |
| | | Shared | MAIN MEMORY → REQUESTING CACHE | Modified | Invalid |
| | Exclusive | Invalid | — | Modified | Invalid |
| | Modified | Invalid | .. | Modified | Invalid |
| SWEER- OUT REQUEST | Invalid | Invalid | — | Invalid | Invalid |
| | | Shared | — | Invalid | Invalid |
| | | Exclusive | — | Invalid | Invalid |
| | | Modified | MODIFIED CACHE → MAINE MEMORY | Invalid | Invalid |
| | Shared | Invalid | | Invalid | Invalid |
| | | Shared | | Invalid | Invalid |
| | Exclusive | Invalid | — | Invalid | Invalid |
| | Modified | Invalid | MODIFIED (OSWN) CACHE → MAINE MEMORY | Invalid | Invalid |

FIG. 9

| ISSUING CACHE | TRANSACTION TYPE | CTH REGISTRATION STATE | CTH OPERATION |
|---|---|---|---|
| OTHER CACHE | READ REQUEST | Miss | SEND TO CACHE TAG MEMORY S-HIT REGISTRATION OF BLOCK |
| | | S-Hit | NOTIFY SHARED TO ISSUING CACHE |
| | | I-Hit | NOTIFY INVALID TO ISSUING CACHE |
| | READ REQUEST(2) | Miss | SEND TO CACHE TAG MEMORY |
| | | S-Hit | NOTIFY SHARED TO ISSUING CACHE |
| | | I-Hit | NOTIFY INVALID TO ISSUING CACHE |
| | WRITE REQUEST | Miss/S-Hit | SEND TO CACHE TAG MEMORY I-HIT REGISTRATION OF BLOCK |
| | | I-Hit | NOTIFY INVALID TO ISSUING CACHE |
| | SWEEP-OUT REQUEST | Miss/S-Hit | SEND TO CACHE TAG MEMORY I-HIT REGISTRATION OF BLOCK |
| | | I-Hit | NOTIFY INVALID TO ISSUING CACHE |
| OWN CACHE | READ REQUEST | Miss/S-Hit | — |
| | | I-Hit | SET BLOCK TO S-HIT |
| | READ REQUEST(2) | Miss | — |
| | | S-Hit/I-Hit | SET BLOCK TO MISS |
| | WRITE REQUEST | Miss | — |
| | | S-Hit/I-Hit | SET BLOCK TO MISS |
| | SWEEP-OUT REQUEST | Miss/S-Hit | I-HIT REGISTRATION OF BLOCK |
| | | I-Hit | — |
| | CACHE-TO-CACHE DATA TRANSFER | Miss/S-Hit/I-Hit | I-HIT REGISTRATION OF BLOCK |
| | DATA TRANSFER TO MAIN MEMORY BY REPLACEMENT | Miss/S-Hit/I-Hit | I-HIT REGISTRATION OF BLOCK (OPTION) |

CACHE COHERENCY CONTROL METHOD AND MULTI-PROCESSOR SYSTEM USING THE SAME

BACKGROUND OF THE INVENTION

The present invention relates to cache coherency control method and multi-processor system using the same.

Recently, the construction of a multi-processor system has becoming popular in order to improve a data processing throughput of a computer system. In the multi-processor system it is common that each of the processors separately owns a cache system. When a plurality of cache systems are provided, a plurality of copies of the same data naturally exist among those systems and it becomes necessary to maintain coherency of the cache data among the plurality of processors. A minimum unit of information which is the subject of storage management is handled as one block between the plurality of cache systems and main memories connected thereto, and the data is transferred by block unit. The maintenance of the cache coherency is attained by invalidating the same cache block as that held by other cache or updating the same cache block into latest data written into its own cache when one processor conducts a write operation to its own cache.

A protocol for maintaining the coherency of the cache data among a plurality of processors is commonly referred to as a cache coherency protocol. It includes the following two systems. First one is called as a directory system in which information items on each block of a main memory are managed at one point in the system. In this system, a logically single directory which describes the status of all blocks on the main memory is provided, and a particular cache on which a copy of each block is stored and a state thereof are recorded in the directory. The directory is, in many cases, implemented in a physically distributed form on the main memory but it is logically singly managed. When the cache system executes the writing to one block, it first refers to the management table to determine if the block has been copied to any other block, and then notifies the writing to the cache system having that block. When the cache system is notified the writing, it operates to maintain the cache coherency.

However, in this directory system, the directory is always referred to before the cache access. As a result, a time from the issuance of a process request to the completion of the process (latency) increases.

A second system is referred to as a snoop system. In this system, all caches hold information on blocks owned by themselves and always monitor a shared bus connecting each cache system and a main memory. In the snoop system, a cache system which conducts a write operation sends the intent of the writing to the shared bus. Other cache systems detect the writing information from the shared bus and determine whether their own systems own that block or not. If it owns, the cache system conducts the control to maintain the cache coherency. In the snoop system, since it is necessary that all cache systems are connected to the shared bus, it is not suitable for a large scale multi-processor system but the latency is shorter than that of the directory system because the determination of the ownership of the copy is conducted parallelly by the individual cache systems and it has been adopted in a number of multi-processor systems.

A coherency protocol in the snoop system is classified into two, write invalidate and write multicast depending on an operation in the writing, and a number of systems including modification thereof have been proposed. "Computer Architecture", Chapter 8, by Henecy and Paterson, discloses cache coherency protocols in a number of multi-processor systems. Many of articles referred to in that reference are found in "The Cache Coherence Problem In Shared Memory Multiprocessor: Hardware Solutions", IEEE Computer Society Press. A cache coherency protocol which is implemented in recent microprocessors is a protocol in Intel Pentium microprocessor. This is disclosed in "Pentium Processor Architecture and Programming", Chapter 18, Intel Japan Co., Ltd. In the Pentium microprocessor, a cache block is managed in four states, Modified, Exclusive, Shared and Invalid (so-called "MESI-values").

The cache coherency protocol of the multiprocessor system by the MESI algorithm includes one adopted by an IBM PowerPC microprocessor. Detail of this system is described in "Power and PowerPC", Chapter 9, Morgan Kaufmann Publishers, Inc. FIG. 2 shows a cache coherency control operation by this protocol.

In FIG. 2, "Invalid" indicates that no effective data is present in the cache block. "Shared" indicates that the same data as that of a main memory (clean data) is present in the cache block but a copy of that data is present in other cache. Namely, it indicates that the clean data of the cache block is shared (or sharable) by other cache. "Exclusive" indicates that the same data as that of the main memory (clean data) is present in the cache block and a copy of that data is not present in other cache. "Modified" indicates that data which may possibly be different from that of the main memory is stored in the cache block and a copy of that data is not present in other cache. When a data is written into the cache block, the written data becomes dirty data which may possibly be different from that of the main memory. Thus, in "Shared", "Exclusive" and "Modified", unlike "Invalid", an effective data to be referred to is present in the cache block.

When a read request is issued from a processor to a cache system, the cache system responds to the reception of the request to first refer to a cache tag memory to determine a state of the block. If the state of the block is "Modified", "Exclusive" and "Shared", it is determined as cache hit and the content of the cache memory is read and sent to the processor. The state of the cache block is left unchanged. On the other hand, if the state of the block is "Invalid", it is determined as cache miss and a read request transaction is issued to the shared bus. Other cache systems snoop the read request transaction from the common bus to check states of their own caches, and if the block is "Modified", "Exclusive" and "Shared", it changes to "Shared". If the block is "Modified", the Modified data is written back to the main memory as the latest data. Thus, the data of the block coincides with the data in the main memory. The data written back to the main memory is read to the shared bus and transferred to the requesting cache system. The requesting cache system sends the received data to the processor and stores the data as "Shared". In order to improve the latency in reading data, the Modified data may be directly transferred to the requesting cache system concurrently with writing it in the main memory.

When a write request is issued from a processor to a cache system, the cache system responds to the reception thereof to first refer to the cache tag memory to determine the state of the block. If the state of the block is "Modified" and "Exclusive", it is determined as cache hit and data is written into the cache block and the block state is changed to "Modified". If the state is "Shared" or "Invalid", it is determined as cache miss and a write request transaction is issued to the shared bus. Other cache systems snoop the write request transaction to check the states of their own caches, and if the block is "Modified", "Exclusive" and "Shared", it changes to "Invalid". If the block is "Modified", the Modified data is written back to the main memory. The data written back to the main memory is read to the shared bus and transferred to the requesting cache system. The requesting cache system merges the received data with the data contained in the write request and stores it as "Modified".

The cache coherency protocol by the MESI algorithm has thus been described. In implementing the cache coherency protocol of the snoop system, a problem of a throughput of the shared bus first occurs. As a performance of the processors connected to the shared bus is improved and as the number of processors connected increases, a throughput required increases more and more. It is thus necessary to improve the implementation throughput of the shared bus while reducing the requested throughput from the processor and the cache system. The improvement of the implementation throughput of the shared bus may be commonly attained by using a high speed operation clock and extending a data width. If the implementation by the bus is not feasible, it may be attained by using an interconnecting network which functions in the same manner as the bus. The reduction of the required throughput from the processor or the cache system is, in many cases, attained by increasing a cache capacity of the cache system or improving the cache structure.

However, those approaches need a large cost.

A second problem in implementing the snoop system is a shortage of throughput relating to the status determination in the snoop. A write operation notice flowing over the shared bus includes an address of the block but in order to determine a state in the cache of the block corresponding to the received address, it is necessary to refer to the cache tag memory which stores tags of blocks held therein. Namely, the cache system conducts the reference to the cache tag memory each time of the access request from other cache system. However, the cache system conducts the reference to the cache tag memory during the data supply service to the processor, in addition to the reference described above. Since the state of the cache block in the cache tag memory which is referred to by both sides should be logically singly managed, the access to the cache tag memory is usually conducted exclusively. The switching of the access causes the shortage of the throughput.

In the prior art, in order to solve the shortage of the throughput, duplicate of the cache tag is provided and the access from the shared bus first refers to the duplicate tag.

However, since it is common to use very high speed memory elements for the cache tag memory for storing the cache tags, the duplication of the cache tag memory is against the cost performance. Further, when a large capacity cache is adopted to increase the hit ratio, the capacity of the cache tag also increases. This is also a factor to impede the duplication.

As described above, an invalidate request is issued to invalidate a block owned by other cache system when a processor conducts a write operation to its own cache. A prior art method to reduce the invalidate request is disclosed in JP-B-6-64553 "Stack Control Circuit", in which a cache system has a plurality of stacks for temporarily storing invalidate requests (specifically, addresses of blocks to be invalidated) received from other processors, compares invalidate addresses among stacks, and when the invalidate addresses coincide, one of them is deleted to reduce the multiple invalidate process to the same address.

However, in this prior art method, since the duplication of the invalidate requests stored in the stacks is detected to reduce the invalidate process therebetween, the reduction can be attained only for the invalidate requests having close reception times. Namely, it is not effective unless the same invalidate request is repeatedly issued in a short time. When the stack capacity is increased to extend the stay time, the duplicate detection effect may be enhanced but the invalidate requests are delayed. When the cache system owns the dirty data and it is notified to the requesting system, the transfer of the latest data is also delayed. Since this delay directly affects the access latency, the holding of a plurality of invalidate addresses in the stacks is a significant loss in performance.

Other prior art technique for reducing the invalidate request is disclosed in "Issues in Multi-Level Cache Designs", 1994 IEEE International Conference On Computer Design: VLSI in Computer and Processors (ICCD '94). In this article, a table called an invalidate history table for recording invalidate requests is introduced. A technology disclosed in this article is briefly explained with reference to FIGS. 12 and 13. FIG. 12 shows a four multi-processors (multi-processors 0~3) each having a primary cache of 32K-byte capacity and a 4M-byte secondary cache connected to each of the multi-processors. As shown in FIG. 12, the cache systems are in a double hierarchy. FIG. 13 shows an example of a history table for sequentially recording the invalidate requests (invalidate addresses) issued by the respective primary caches. The history table is loaded in a tag memory of the secondary cache. FIG. 13 shows the history table as well as an address register for storing a given invalidate address, a secondary cache tag table, a secondary cache hit determination circuit for comparing addresses (tags) stored in the secondary cache tag table with the address stored in the address register to determine the hit, and a history table hit determination circuit for determining the hit on the history table.

When an invalidate address is issued from the primary cache, the history table is referred to, and if it hits, it is determined that the invalidation has already been made and the request is deleted. When a first invalidate request to a block is issued, the address of the block is not yet registered in the history table and, in this case, the address is registered in the history table and the invalidate request for that address is issued to all other primary caches.

By this arrangement, the invalidate requests to other primary caches other than the first one request are eliminated and the process for the invalidate request in other primary caches is reduced.

However, in this prior art technology, the states of all primary caches connected to the secondary cache are centrally managed by the history table. For example, when a coherency request from a primary cache is issued, the history table of the secondary cache is first referred to, and if it does not hit, the coherency request is transferred to the corresponding primary cache. Namely, in the prior art technology, it is nothing but the arrangement of a directory of the directory system as viewed from the primary cache in the secondary cache. In this method, the transfer is conducted twice and the access latency for the coherency request increases.

SUMMARY OF THE INVENTION

In the light of the above, it is an object of the present invention to provide a cache coherency control method which can efficiently and quickly determine consistency of cache blocks and a multiprocessor system using the same.

In order to achieve the above object, in accordance with one aspect of the present invention, there is provided a cache coherency control method for managing consistency of data blocks of the same address present among a plurality of cache systems by cache tag memories provided in the respective cache systems and said address, sending a process content and said address from one cache system to other cache system for some processes when a process to said data block is conducted in said one cache system to maintain data coherency among the plurality of cache systems, comprising the steps of: providing a history table in each of the plurality of cache systems and storing at least a portion of addresses issued from other cache systems in said history table; when said address is already stored in the history table of the cache system to which said address is notified, suppressing the accessing to the cache tag memory for the current address issue in the cache system; and when said address is not stored in the history table of the cache system to which said address is notified, accessing the cache tag memory for the current address issue in the cache system.

A principle of operation of the present invention is first explained.

First, a process of sharing a read-only block by a plurality of cache systems is explained.

It is assumed that a first cache system reads the block from a main memory. In this case, since other cache systems do not own the block, the cache block is registered in the reading first cache system as "Exclusive". Then, a second processor issues a read request for the block to a shared bus. The first processor snoops the read request and changes the previously registered state of the block to "Shared". In this case, third and fourth processors, in addition to the second processor, snoop the read request to determine whether the relevant block is present in their own processors. The second processor receives the notice from the first processor and registers the data read from the main memory as "Shared". The subsequent read processes of the processors are the repetition of the same process.

In the prior art, each time the read request is issued from one processor to the shared bus, other cache systems snoop it and conduct the accessing to the cache tag memory to determine if the relevant block is present in their own.

A process of sharing a write block by a plurality of processors is explained, too.

First, it is assumed that the first cache system reads the block from the main memory when the write request is issued. In this case, since other cache systems do not own the block, the block is registered in the first cache system as "Modified". Then, the second processor issues a write request to the block to the shared bus. The first processor snoops the write request and sends the latest data which it owns by itself to the second processor and change the state of the block to "invalid". The second processor receives the latest data from the first processor and registers it as "Modified". Thereafter, each time other processor or the first processor issues the write request for the block, the write request is issued -to the shared bus and the latest data is received from the cache system which has the "Modified" state block.

In the prior art, each time a processor issues the write request to the shared bus, other cache systems snoop it and execute the accessing to the cache tag memory.

However, when the protocol as shown in FIG. 2 is used, each cache system is not necessarily required to conduct the determination for every read request or write request issued from other cache systems.

For example, once the cache system registers the block as "Shared", it is not necessary to change the state in the subsequent read request of other cache system. The same is true for "Invalid" and it is not necessary to set "Invalid" for every request.

Further, even if the writing is conducted in one processor, the processors other than the requesting processor and the processor supplying the latest data need not check the state of the cache block each time once they determine that the state of the cache block is "Invalid".

The present invention was made in consideration of the above and it intends to store the addresses issued by other cache systems in the history table in order to eliminate the next request for the same address.

Other objects, features and advantages of the present invention will become apparent by reading the following description of the embodiments in conjunction with the accompanying drawings.

BRIEF DESCRIPTION OF THE DRAWINGS

FIG. 2 shows a chart (No. 1) of an operation of each cache system when a cache coherency control of the present invention is applied, FIG. 3 shows a chart (No. 1) of an operation of a cache coherency transaction history (CTH) of the present invention, FIG. 4 shows a configuration of the cache coherency transaction history (CTH) of the present invention, FIG. 5 shows a chart of a hit determination logic of the cache coherency transaction history (CTH) of the present invention, FIG. 6 shows a chart (No. 2) of an operation of the cache coherency transaction history (CTH) of the present invention, FIG. 8 shows a chart (No. 2) of an operation of each cache when a cache coherency control of the present invention is applied, FIG. 9 shows a chart (No. 3) of an operation of the cache coherency transaction history (CTH) of the present invention.

DETAILED DESCRIPTION OF THE PREFERRED EMBODIMENTS

Embodiments of the multi-processor system according to the present invention are now explained with reference to the accompanying drawings.

Figure 1:
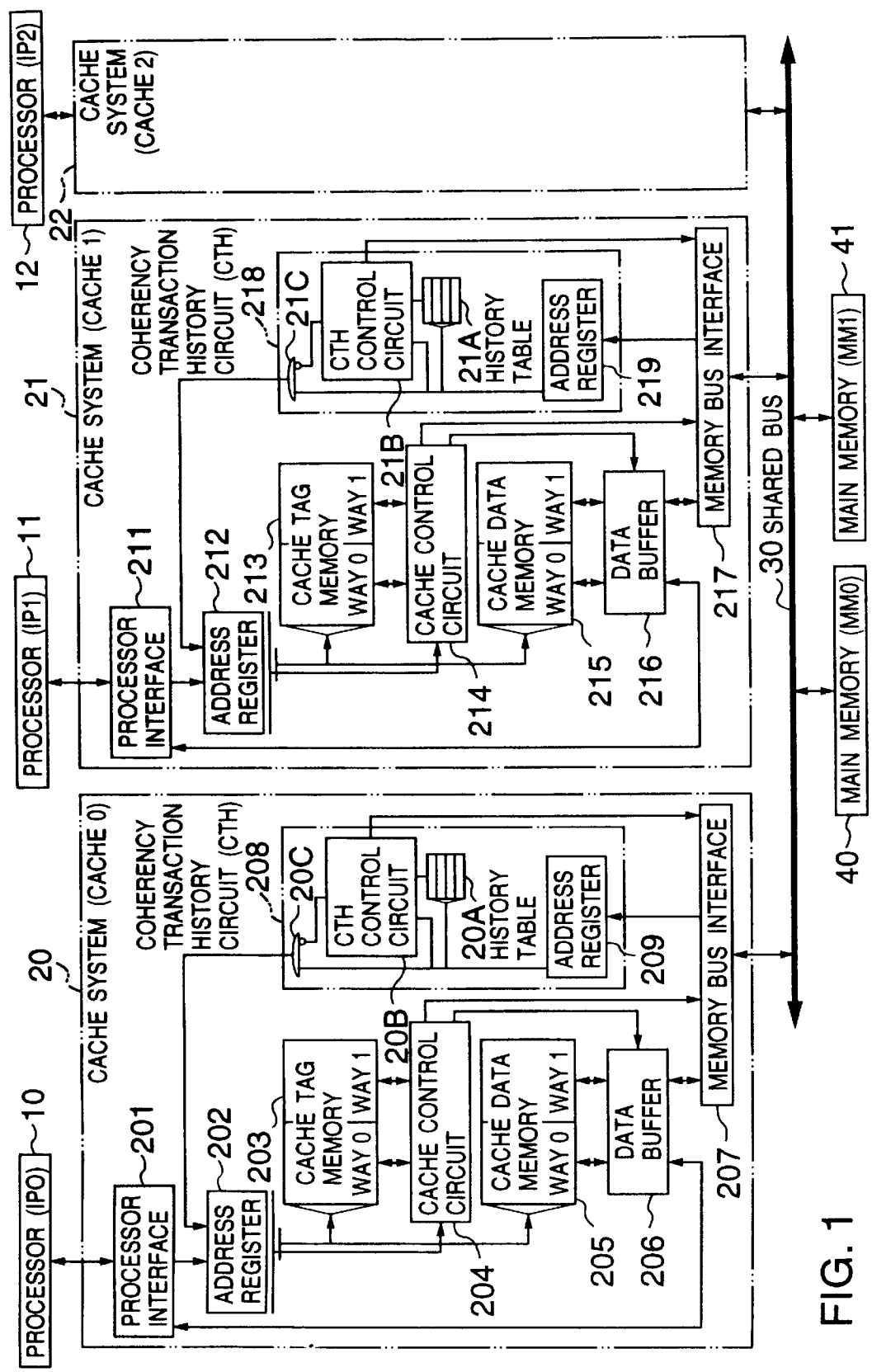
FIG. 1 shows a block diagram of a first embodiment of a multi-processor system of the present invention.

FIG. 1 shows a block diagram of a multiprocessor system in accordance with a first embodiment. The multi-processor system comprises three processors (processor 10, processor 11 and processor 12), three cache systems (cache systems 20, 21 and 22), two main memories (main memories 40 and 41) and a shared bus 30 connected to the two main memories and the three cache systems. The number of processors, the number of cache systems and the number of main memories may be changed in accordance with a multi-processor system to be constructed.

The cache system 20 comprises a processor interface 201 which is an interface with the processor 10, a memory bus interface 207 which is an interface with the shared memory 30, a coherency transaction history control circuit (CTH control circuit) 208 which is a feature of the present embodiment, an address register 202 functioning as an address selector in which addresses sent from the processor interface 201 and the CTH control circuit 208 are stored and selected, a cache data memory 205 in which cache data is stored, a cache tag memory 203 in which addresses of cache data stored in the cache data memory 205 are stored, a data buffer 206 in which data stored in the cache data memory 205 and data read from the cache data memory 205 are temporarily stored, and a cache control circuit 204 for controlling each unit in the cache system 20. The cache tag memory 203 is implemented by using memory elements which are of higher speed than the main memories 40 and 41. For example, the main memories 40 and 41 use DRAMs (Dynamic Random Access Memories) and the cache tag memory 203 uses an SRAM (Static Random Access Memory). The cache data memory 205 is of so-called two-way set-associative structure in which two blocks are included in one set). A plurality of such sets are used. A block of each set is a minimum unit of information which is subject of information management, and the exchange of data between attached devices such as between cache systems or between the cache system and the main memory is conducted by the block unit. The cache tag memory 203 is also of two-way set-associative structure to conform to the cache data memory 205. Each block is preassigned with a specific address (tag) and the tag is stored in the cache tag memory 203. The structures of the cache tag memory 203 and the cache data memory 205 have been well known in the art and detailed description thereof is omitted.

The cache system 21 is constructed in the same manner as the cache system 20. Namely, the cache system 21 comprises a processor interface 211, a memory bus interface 217, a coherency transaction history control circuit (CTH control circuit) 218, an address register 212, a cache data memory 215, a cache tag memory 213, a data buffer 216, and a cache control circuit 214. A configuration of the cache system 22 is not shown but it is same as that described above.

In the multi-processor system described above, when a read request is issued from the processor 10, the cache system 20 receives the request at the processor interface 201. Then, the cache system 20 sets an address (request address) included in the read request in the address register 202, and accesses the cache tag memory 203 and the cache data memory 205. The content of the cache tag memory 203 is conveyed to the cache control circuit 204 to determine the cache hit. In this case, whether the tag corresponding to the request address is present in the cache tag memory 203 or not is determined, and when the intended tag is present, a state of a block corresponding to the tag is determined. The determination of the state of the block will be described later. When the cache hits, the cache data of the block of the corresponding tag is read from the cache data memory 205 and it is set in the data buffer 206. The data is returned to the processor 10 through the processor interface 201.

On the other hand, in case of the cache miss, it is notified to the memory bus interface 207 and a read request transaction is issued from the memory bus interface 207 to the shared bus 30. The read request transaction flows over the shared bus 30 and arrive at other cache systems and the main memories 40 and 41. Then, the latest data is returned to the shared bus 30 from the main memory or other cache system. The memory bus interface 207 receives the latest data and transfers it to the data buffer 206. The data is returned to the processor 10 through the processor interface 201. Further, the same data is written into the cache data memory 205.

When the write request is issued by the processor 10, the cache tag memory 203 is referred to determine the hit as it is done for the read request. In case of the cache hit, the write data sent from the processor 10 is written into the cache data memory 205 through the data buffer 206.

On the other hand, in case of the cache miss, a write request transaction is issued from the memory bus interface 207 to the shared bus 30. The memory bus interface 207 then receives the latest data from the main memory or other cache system and transfers it to the data buffer 206. In the data buffer 206, the latest data is merged with the write data from the processor derived through the processor interface 201 and the merged data is written into the cache data memory 205. The data transmission and reception are conducted by the block unit as described above. Thus, the write data from the processor and the latest data received from other cache system normally coexist in the block of the cache data memory 205. When the block in the cache is subject of replacement because of memory full state, the content thereof is written into the main memory. A system in which the data is written into the main memory under only a predetermined condition, and in other cases, data is written to the block of the cache is commonly referred to as a write-back system. The present invention is not limited to this system.

The cache coherency control conducted in the present multi-processor system is by the protocol shown in FIG. 2. This protocol has been described in conjunction with the prior art and each block in the cache is managed by four states (so-called MESI algorithm), Modified, Exclusive, Shared and Invalid. In FIG. 2, "Invalid" indicates that no effective data is present in the cache block. "Shared" indicates that the same data as that of the main memory (clean data) is present in the cache block but a copy of the data is present in other cache. Namely, the clean data of the cache block is shared by other cache. "Exclusive" indicates that the same data as that of the main memory is present in the cache block and a copy of the data is not present in other cache. "Modified" indicates that the data which may be possibly different from that of the main memory is stored in the cache block and a copy of the data is not present in other cache. When data is written into that cache block, the written data is dirty data which may be possibly different from that of the main memory. In this manner, in "Shared", "Exclusive" and "Modified" states, unlike in the "Invalid" state, the effective data to be referred to is present in the cache block. The state of the block is stored in the cache tag memory 203.

The flows of the read request and the write request described above are further explained in conjunction with the cache coherency control.

When the read request is issued from the processor 10, the request address is set in the address register 202 and the determination process is conducted by the cache control circuit 204. This has been described above, and in the determination process, if the state of the block indicated by the request address is "Modified", "Exclusive" and "Shared", it is determined as the cache hit. In this case, the content of the corresponding block of the cache data memory 205 is read and it is returned to the processor 10. The block state remains unchanged. On the other hand, if the state is "Invalid", it is determined as the cache miss and the read request transaction is issued from the memory bus interface 207 to the shared bus 30. Other cache systems 21 and 22 snoop the transaction flowing over the shared bus 30 to check the state of the caches of their own. Since similar checks are conducted in the cache systems 21 and 22, the cache system 21 is explained herein as an example. The cache system 21 sends the read request transaction read from the memory bus interface 217 to the CTH control circuit 218. The operation of the CTH control circuit 218 will be described later and it is now assumed that the read request transaction does not hit in the CTH control circuit 218 and it is passed as it is and transferred to the address register 212. Specifically, the read address included in the read request transaction is set in the address register 212 by the transfer. The cache control circuit 214 determines whether the tag corresponding to the address set in the address register 212 is present in the cache tag memory 213 or not and determines the block indicated by the tag. If the state of the block is "Modified", "Exclusive" or "Shared", it is changed to "Shared". If the state of the block is "Exclusive" and "Shared", it means that the latest data required by the cache system 20 is also present in the main memory 40 or the main memory 41. Accordingly, in this case, the latest data stored in the main memory 40 or 41 is read to the shared bus 30 and transferred to the cache system 20. If the state of the block is "Modified", the data in the block is the latest data. Accordingly, in this case, the data of the block is read from the data buffer 216 and it is sent to the shared bus 30 through the memory bus interface 217. Thus, the latest data held in the cache system 21 is transferred to the requesting cache system 20. The main memories 40 and 41 also receive the latest data through the shared bus 30 and read the received latest data in the block. The requesting cache system 20 receives the latest data flowing over the shared bus 30 through the memory bus interface 207. Then, the requesting cache system 20 returns the received latest data to the processor 10 and stores the same data in the cache data memory 205. The state of the block when it is stored is "Shared" irrespective of the state of the block of other cache system 21.

When the write request is issued from the processor 10, the cache memory 203 is referred to as it is in the previous case, and the determination process is conducted in the cache control circuit 204. If the state of the block is "Modified" and "Exclusive", it is determined as the cache hit and the writing is made to the block. If it is "Exclusive", the state of the block is set to "Modified". If it is "Shared" or "Invalid", it is determined as the cache miss and the write request transaction is issued from the memory bus interface 207 to the shared bus 30.

Like in the case of the read request, other cache systems 21 and 22 snoop the transaction flowing over the shared bus 30 to check the states of their own caches. Since the same check process is conducted in the cache systems 21 and 22, the cache system 21 is explained herein as an example. The cache system 21 sends the write request transaction read from the memory bus interface 217 to the CTH control circuit 218. The operation of the CTH control circuit 218 will be described later and it is now assumed that the write request transaction does not hit in the CTH control circuit 218 and is passed as it is and transferred to the address register 212. Specifically, the write address included in the write request transaction is set in the address register 212 by the transfer. The cache control circuit 214 determines whether the tag corresponding to the address set in the address register 212 is present in the cache tag memory 213 or not and determines the state of the block indicated by the tag. If the state of the block is "Modified", "Exclusive", and "Shared", it is changed to "Invalid". If the state of the block is "Exclusive" or "Shared", it means that the latest data required by the cache system 20 is also present in the main memory 40 or the main memory 41. Accordingly, in this case, the latest data stored in the main memory 40 or 41 is read to the shared bus 30 and it is transferred to the cache system 20. If the state of the block is "Modified", the data in the block is the latest data. Accordingly, in this case, the data of the block is read to the data buffer 216 from the cache data memory 215 and it is sent to the shared bus 30 through the memory bus interface 217. Thus, the latest data held by the cache system 21 is transferred to the requesting cache system 20. The main memories 40 and 41 also receive the latest data through the shared bus 30 and write it to the corresponding block. The requesting cache 20 receives the latest data through the memory bus interface 207 and stores it in the data buffer 206. The latest data is further merged with the write data sent from the processor 10 and it is written into the corresponding block of the cache data memory 205. The state of the block is "modified" irrespective of the state of the block of other cache system 21.

The coherent transaction history control circuit (CTH control circuit) 208 which is the feature of the present embodiment is now explained. The CTH control circuit 208 is provided to intercept the transfer path between the memory bus interface 207 and the address register 202, provided to conduct the coherency control. The CTH control circuit 208 comprises a coherency transaction history table (CTHT) 20A, a CTH control circuit 20B, an AND gate 20C and an address register 209. Details of the CTHT control circuit 20B are shown in FIG. 4. Reference numerals of components of a CTH control circuit 218 in the cache system 21 are shown in parentheses of FIG. 4. The CTH control circuit 20B comprises a comparator 801 and a CTH hit determination circuit 802. In constructing the history table 20A, a scheme which has been adopted in a conventional cache data memory may be applied as it is. Namely, any one of a direct map scheme in which a location of each block on a cache is uniquely determined, a full associative scheme in which a block may be positioned at any location on the cache, and a set associative scheme in which a block may be positioned in only a predetermined range on the cache may be adopted. In the present embodiment, the direct map scheme is adopted to for simplification of the description.

The CTH control circuit 208 of the present embodiment may handle a 32-bit width address (an address which can express a 4 GB space) and a 32-bit address supplied externally is set in the address register 209. The CTHT 20A is a table which has 2K-entry storage areas (entries) each having 18-bit size and entry numbers 0~2047 are assigned to those storage areas. Detail of the 18 bits provided for each entry is 16 bits for holding high order 16 bits of the address set in the address register 209 and two status bits for indicating the state of the block indicated by the address. The entry numbers 0~2047 are compared with the 11 bits, bit 16 to bit 26 of the address when the address is set in the address register 209. The status bit is set to one of "Miss", "S-Hit" and "I-Hit". "Miss" is set when the address set in the address register 209 is not registered in the CTHT 20A. "S-Hit" is set when the address set in the address register 209 is registered in the CTHT 20A and the state of the block in the cache tag memory 203 is "Shared" or "Invalid". "I-Hit" is set when the address set in the address register 209 is registered in the CTHT 20A and the state of the block in the cache tag memory 203 is "Invalid".

When the CTH control circuit 208 receives the write request transaction or the read request transaction from the memory bus interface 207, it sets the address included in the transaction in the address register 209. The 11 bits, bit 16 to bit 26, of the address set in the address register 209 are compared with the entry numbers of the CTHT 20A and the 16-bit data (18-bit data less 2 status bits) stored in the matched entry number is outputted to the comparator 801. The 16-bit data outputted to the comparator 803 is compared with the high order 16 bits of the address set in the address register 209 and the result is outputted to the CTH hit determination circuit 802 as the address hit signal. The CTH hit determination logic 802 receives the address hit signal 803 and the status bit signal 804 representing the status bit state of the CTHT 20A and conducts a predetermined determination process based on those signals. The result of the determination is outputted as a CTH state signal 806 and a transfer suppress signal 805. The CTH state signal 806 is outputted to the memory bus interface 207 and the transfer suppress signal 805 is outputted to the AND gate 20C. When the AND gate 20C receives the transfer suppress signal 805, it outputs the address set in the address register 209 as it is to the address register 202. Or it cancels the output.

FIG. 5 shows an operation chart of the CTH hit determination circuit 802. FIG. 3 shows an operation chart of the CTH control circuit 20B including the operation of the CTH hit determination circuit 802.

As shown in FIG. 5, the address hit signal 803 represents either "hit" or "miss" which is discriminated by a set voltage. It is assumed hereinafter that various states represented by signals are discriminated by the set voltages. "Hit" is set when the 16-bit data stored in the entry selected by the CTHT 20A coincides with the high order 16 bits of the address set in the address register 209. "Miss" is set when these bits do not match. The transfer suppress signal 805 set to either "0" or "1" based on the address hit signal 803 and the status bit signal 804. When the AND gate 20C receives the transfer suppress signal "0" 805, it outputs the address set in the address register 209 as it is to the address register 202. When the AND gate 20C receives the transfer suppress signal "1" 805, it cancels the outputs of the address set in the address register 209. The CTH state signal 806 is set basically to the same state as the status bit, but when the status bit is invalid "−", it is set to "miss".

Referring to FIGS. 5 and 3, the operation of each of the cache systems is explained. It is now assumed that other cache system is the cache system 20 and the own cache system is the cache system 21.

When the CTH control circuit 218 of the one cache system 21 receives the read request from the other cache system 20 through the memory bus interface 217, it operates in accordance with the address indicated by the read request and outputs the result as the CTH state signal 816 and the transfer suppress signal 815. Specifically, when the address is not registered in the CTHT 21A, or when the address is registered in the CTHT 21A, but the status bit is invalid, it outputs the CTH state signal representing "miss" and the transfer suppress signal 815 representing "0". By the transfer suppress signal 815, the read request address is transferred as it is to the address register 212. Concurrently with the transfer process, the address sent to the address register 212 is registered in the CTHT 21A as "S-Hit". When the address is sent to the address register 212, the access to the cache tag memory 213 explained in FIG. 2 is subsequently made. On the other hand, if the address of the read request hits as "S-Hit" or "I-Hit", the transfer of the address by the AND gate 21C is suppressed. As described above, "S-Hit" or "I-Hit" is set when the corresponding block is "Shared" or "Invalid" in the cache tag memory 213. If the block is either "Shared" or "Invalid", the data required by the cache system 20 is supplied from the main memory and the state of the block of the cache tag memory 213 is not changed as explained in FIG. 2. Namely, when "S-Hit" or "I-Hit" occurs for the read request from the other cache, the read address is not particularly required by the cache tag memory. Accordingly, by suppressing the address transfer in this case, the process in the cache tag memory is saved and the load is reduced. The response to the cache system 20 is conducted by the CTH control circuit 218 in response to the non-operation of the cache tag memory. Namely, in case of "S-Hit", the CTH control circuit 218 notifies to the cache system 20 that the block is "Shared". In case of "I-Hit", it notifies to the cache system 20 that the block is "Invalid". The load of the notice process is incomparably smaller than the load when the entire cache tag memory is operated.

When the CTH control circuit 218 of the one cache system 21 receives the write request from the other cache system 20 through the memory bus interface 217, it operates in accordance with the address indicated by the write request and outputs the result as the CTH state signal 816 and the transfer suppress signal 815 as it is in the previous case. Specifically, when the address is not registered in the CTHT 21A, or when the address is registered in the CTHT 21A but the status bit is invalid, it outputs the CTH state signal representing "miss" and the transfer suppress signal "0" 815 as it does for the read request. By the transfer suppress signal 815, the read request address is transferred as it is to the address register 212. Concurrently with the transfer process, the address sent to the address register 212 is registered in the CTHT 21A as "I-Hit". When the address is sent to the address register 212, the access to the cache tag memory 213 explained in FIG. 2 is thereafter conducted. In case of "S-Hit", the above operation is conducted, too. As described above, "S-Hit" is set when the block is "Shared" or "Invalid" in the cache tag memory 213, and when the state of the block is "Shared", it is necessary to change it to "Invalid". Accordingly, the address transfer is conducted even in case of "S-Hit" for the read request. On the other hand, when the address of the write request hits as "I-Hit", the address transfer by the AND gate 21C is suppressed. In case of "I-Hit", since the write address is not particularly required by the cache tag memory, the address transfer is suppressed. In case of "I-Hit", the CTH control circuit 218 notifies to the cache system 20 that the block is "Invalid".

For the read request or the write request issued by the own cache system, the hit is determined by the CTH control circuit 218 without regard to whether it hits or misses. Namely, only the CTHT 21A is updated as required and the address transfer to the cache tag memory 213 is not conducted. The updating of the CTHT 21A is conducted in the following manner. When "S-Hit" or "I-Hit" occurs for the write request, the state of the block is changed to "miss". Thus, the block is deleted from the CTHT 21A. When "I-Hit" occurs for the read request, the state of the block is changed to "S-Hit". In other cases, the state of the block is not changed. "S-Hit" may always be registered at the time of the read request, but when an unshared block is positively registered in the history table, a hit ratio of the history table may be lowered. Accordingly, it is advantageous to control to register only the block which has been registered as "I-Hit" by other cache request, as "S-Hit".

FIG. 6 shows another operation of the CTH hit determination circuit. In this embodiment, the states of the block to record in the coherency transaction history table (CTHT) are only "Miss" and "Hit". "Hit" corresponds to "I-Hit" described above. When a capacity of the history table is limited, it is efficient to register only those data which have high time locality, but it is common that the write request has a higher locality than the read request in view of the data sharing. Accordingly, in the present embodiment, only the write transaction is recorded in the history table.

In accordance with the present embodiment, the rapid determination of the state of the cache block is attained and the speed of the registration of the block in the cache in case of the cache miss is increased. As the number of times of access to the cache memory by the request from other cache system is decreased, the access from the own processor is not delayed. The cache tag memory usually uses fast and expensive memory and the degree thereof increases as the required throughput increases. By decreasing the number of access to the cache memory and reducing the required throughput itself as it is performed in the present embodiment, the hardware cost may be reduced.

Figure 7:
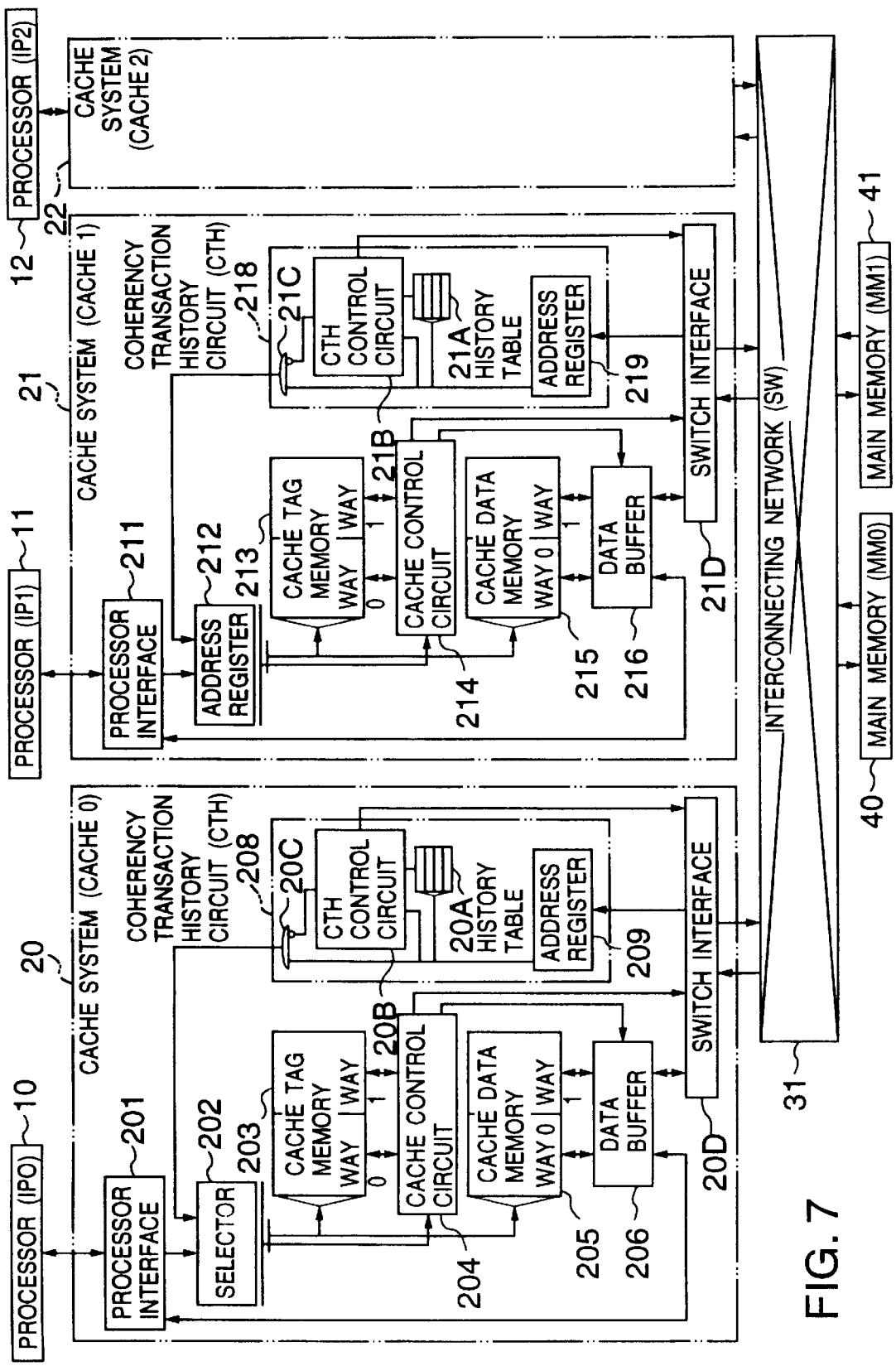
FIG. 7 shows a block diagram of a second embodiment of the multi-processor system of the present invention.

FIG. 7 shows a block diagram of the second embodiment of the multi-processor system in accordance with the present invention. In FIG. 7, a numeral 31 denotes an interconnecting network (switch) and numerals 20D and 21D denote switch interfaces. Other elements are identical to those of FIG. 1. The switch may be a so-called cross-bar switch. As described in the Description of the Related Art, it is highly possible that the throughput of the shared bus is short in the snoop system. Since all of the processors, the cache systems and the main memories are connected to the bus, the upper limit of the operation frequency is limited by the signal propagation delay time even if it is attempted to raise the operation frequency to improve the throughput. Further, when the data width is increased, the data widths of the cache systems connected thereto and the main memories are to be increased and it leads to the increase of the cost. On the other hand, since the packaging condition of the switch is less severe than that of the bus, it is effective when a large throughput is needed. In order to attain the snoop system in the switch coupling, the coherency request may be multicast to all cache systems that require the coherence control and it may be snooped by other cache systems as it is for the bus. In the multi-processor system of FIG. 7, the cache coherency control by the coherency protocol shown in FIG. 2 may be attained as it is in the system of FIG. 1. For the coherency transaction history control, any aspect of FIGS. 3 and 6 and FIG. 9 to be explained later may be applied.

FIG. 8 shows a coherency protocol which is different from that shown in FIG. 2. This protocol includes several extensions from the protocol of FIG. 2. First, in addition to the read request, a read request (2) is added. The read request in FIG. 8 is identical to the read request in FIG. 2. In case of the cache miss for the read request, it is registered as "Shared" as described above, but when the writing is executed for the block registered as "Shared", the cache miss occurs again. Thus, when the data read operation is conducted and the result is written in the block in which both the reading and the writing are conducted, two cache misses for the reading and the writing occur and the system performance is lowered. For such block, the write request might be previously issued, but it is very difficult to detect by the hardware at the time of the execution of the read instruction whether the writing would subsequently occur in the same block or the writing would occur for other block.

The newly added read request (2) has been modified to detect the state of other cache system at the time of the cache miss by the read request as it is done in the prior art Illinois algorithm, and if the block has been registered in the other cache, it is registered as "Shared", and when the block is not registered in all other caches, it is registered as "Exclusive". Further, when the state of the other cache is "Modified" and the cache-to-cache data transfer occurs, the transfer source cache is made "Exclusive" and the state of the transfer destination cache is registered as "Exclusive". The selection of the read request and the read request (2) may be conducted by using a page table and to issue a read exclusive request to the block for which the read exclusive is designated and use the read request (2) for the page which is both readable and writable. Thus, the appropriate cache status may be registered for the block which is both readable and writable and the occurrence of the cache miss may be reduced to some extent.

In the coherency protocol of FIG. 8, a sweep-out request of the cache is also added. The sweep-out request of the cache is a system control instruction provided in the software to maintain the coherency between the input/output processor and the cache memory of the processor when the input/output processor is connected to the system. In many cases, the input/output processor (not shown) is connected to the shared bus and it executes the reading and the writing for the main memory independently from the processor. Since the control of the coherency between the input/output processor and the processor is implemented by the cooperative work of the hardware and the software, the coherency control by the hardware between the cache systems of the multi-processor system is not necessary but the system control instruction such as the sweep-out request is provided. When the block is registered on the cache, the sweep-out request sweeps out the data to the main memory in case of "Modified" and changes the state to "Invalid". In case of "Exclusive" or "Shared", the state is changed to "Invalid". This request is conducted for all cache systems that maintain the cache coherency. When the sweep-out request is executed, each of the cache systems is in an unregistered state. By storing this state in the history table, when one processor again reads data from the main memory after the completion of the input/output operation, the occurrence of a heavy throughput request to the cache tag memory by the read request from the cache system of the other processor may be avoided.

In the coherence protocol of FIG. 8, when the transaction issued by the other cache system is snooped and the transaction type is the read request (2), whether it is registered as "Shared" or "Exclusive" is notified through the shared bus. The requesting cache system registers it as "Exclusive" only when it is notified from all other cache systems that the registration as "Exclusive" is permitted.

An operation of the CTH control circuit 208 for the coherency protocol of FIG. 8 is shown in FIG. 9. Since the operation of the history table for the read request and the write request is identical to that of FIG. 3, the explanation thereof is omitted. For the read request (2) issued by the other cache, the registration to the history table 20A is not conducted. Instead, when the cache-to-cache data transfer issued by the own cache and the data transfer to the main memory by the replacement occur, the block is registered in the history table as "I-Hit". When the sweep-out request is snooped, the block is registered as "I-Hit" without regard to whether the requesting cache is the own cache or the other cache. The replacement is an operation to write back any block (for example, least recent block) when a new cache data block is added to a fully entered cache data memory.

Figure 10:
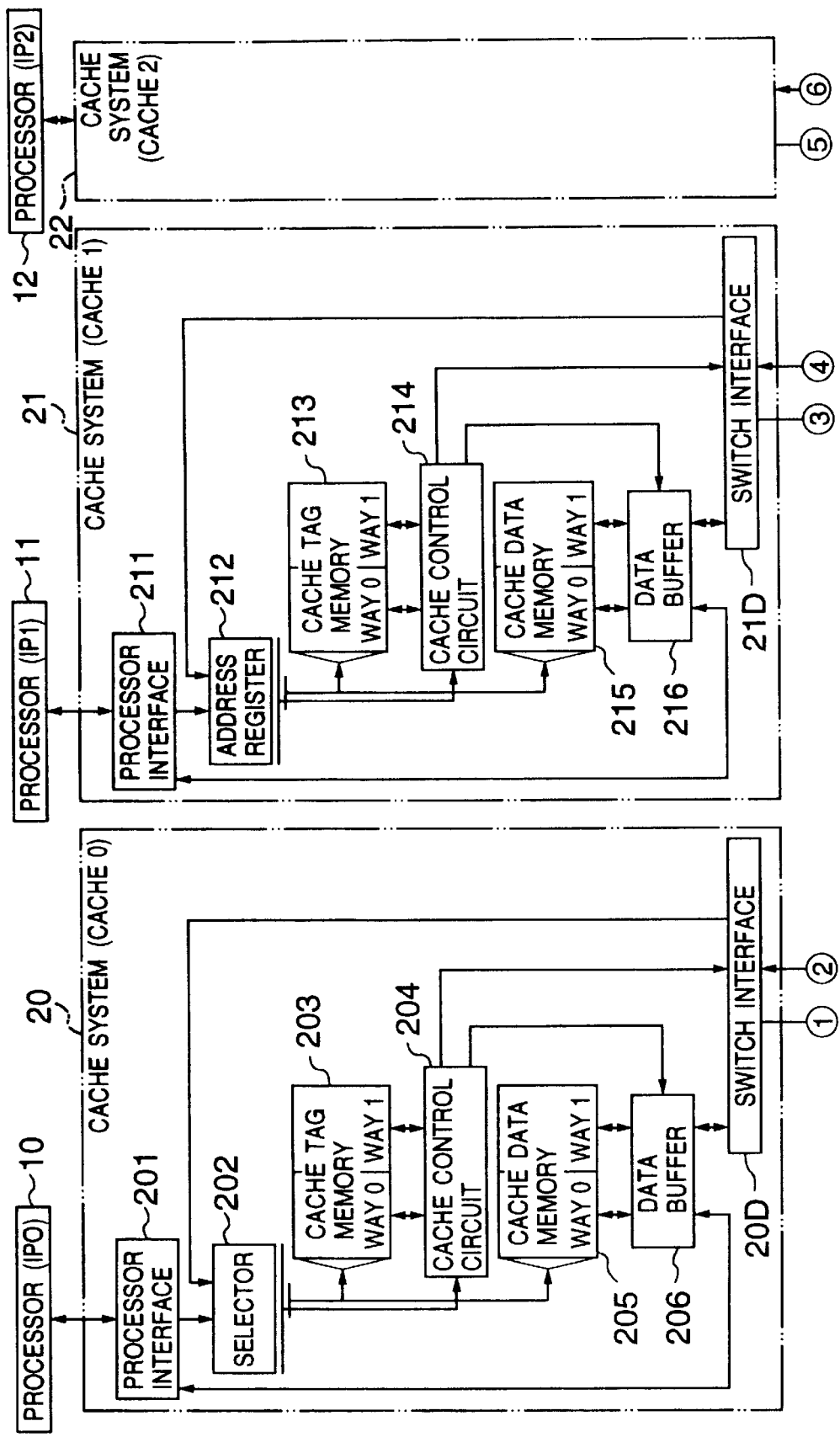
FIG. 10 shows a block diagram (No. 1) of a third embodiment of the multi-processor system of the present invention.
Figure 11:
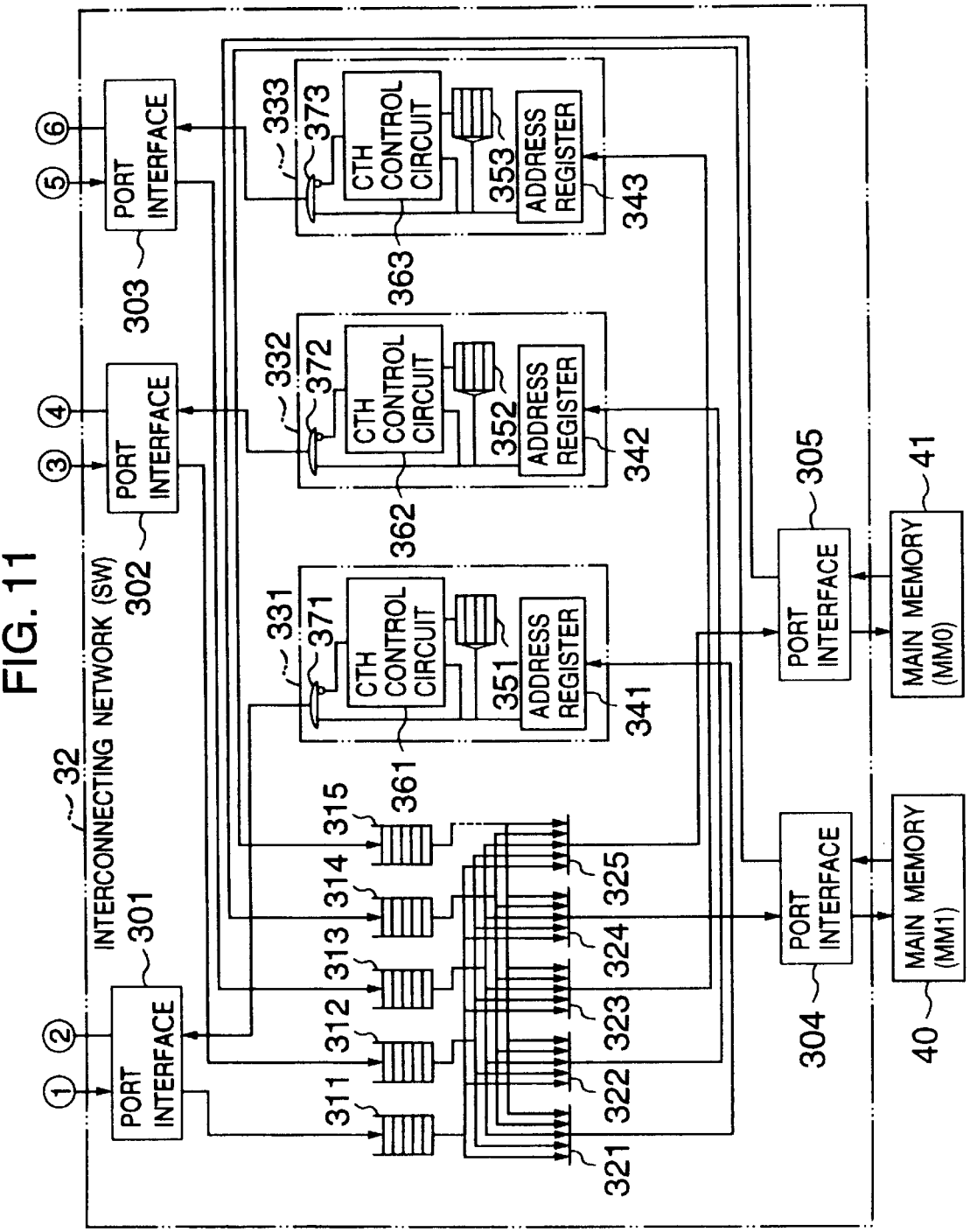
FIG. 11 shows a block diagram (No. 2) of the third embodiment of the multi-processor system of the present invention.
Figure 12:
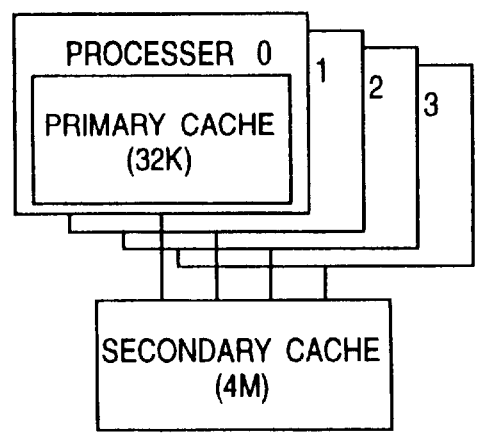
FIG. 12 shows a configuration (No. 1) of a prior art control circuit for reducing invalidate requests.
Figure 13:
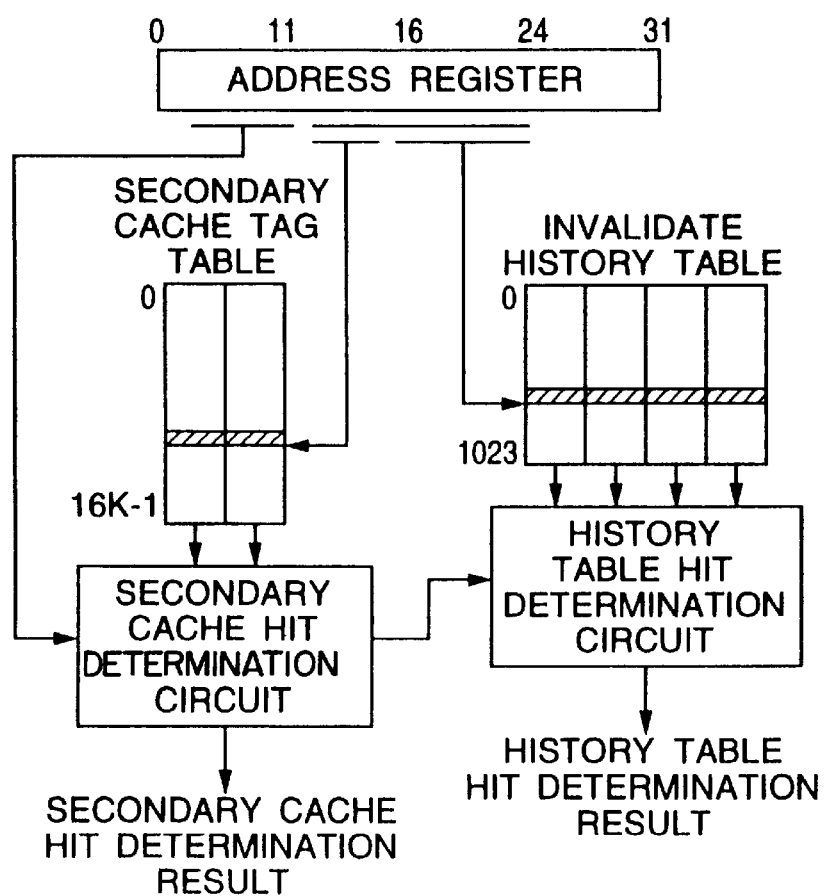
FIG. 13 shows a configuration (No. 2) of the prior art control circuit for reducing invalidate requests.

FIGS. 10 and 11 show a block diagram of a third embodiment of the multi-processor system in accordance with the present invention. FIG. 11 is a continuation from FIG. 10 and those figures represent one multiprocessor system.

In FIG. 10, a plurality of processors (cache systems) and a main memory are connected by an interconnecting network as they are in the multi-processor system of FIG. 7. In the present embodiment, the coherency transaction history control circuit (CTH control circuit) is provided on the interconnecting network. The interconnecting network 32 comprises port interfaces 301~305, switch queues 311~315 and selectors 321~325, and coherency transaction control circuits 331~333 are inserted between the port interfaces 301~303 which output to the cache system which converts the input signals from all ports to the output signals by the cross-bar switch and selectors 321~323. The configuration of the coherency transaction history control circuit is identical to that shown in FIG. 4, and the address of the block not registered in the cache tag memory of the cache system connected to the output port and the address of the block which is registered but registered as "Shared" are held therein. By this configuration, the signal throughput between the interconnecting network 32 and the cache systems 20~22 may be reduced. The cache coherency protocol and the operation chart of the coherency transaction history control circuit may be same as those of other embodiments.

In the present embodiment, the protocols of FIGS. 2 and 8 may be used as the cache coherency protocol although other protocols such as the Illinois protocol and the write-once protocol may be used. The information to be registered in the history table may be "Invalid" and "Shared" as well as other information which conform to the condition of the protocol used.

The embodiments of the present invention have thus been described. Since the history table may use a smaller and faster memory than the cache tag memory, the consistency of the cache blocks may be attained quickly.

What is claimed is:

1. A cache coherency control method for managing consistency of data blocks of the same address present among a plurality of cache systems by cache tag memories provided in the respective cache systems and said address, each of said cache systems having a cache data memory and a cache tag memory, and sending an access type and said address from one cache system to other cache system when a process to said data block is conducted in said one cache system to maintain data coherency among the plurality of cache systems, comprising the steps of:

providing a history table in each of the plurality of cache systems and storing at least a portion of addresses issued from other cache systems in said history table;

when said address is stored in the history table of the cache system to which said address is received, suppressing the accessing to the cache tag memory for the current address issue in the cache system; and when said address is not stored in the history table of the cache system to which said address is notified, accessing the cache tag memory for the current address issue in the cache system.

2. A cache coherence control method according to claim 1, wherein said history table is implemented by memory elements of faster operation speed than that of said cache tag memory of each cache system.

3. A multi-processor system including a plurality of cache systems and at least one main memory shared by said cache systems, each of said cache systems having a cache data memory, a cache tag memory for storing tags attached to respective data blocks in said cache data memory and consistency information representing consistency of respective data blocks and a cache control circuit for conducting the access to said cache data memory and said cache tag memory, wherein at least a portion of at least two cache systems receives a process request and an address issued from other cache system and the cache control circuit of the cache system which received said process request and said address sets a content of consistency information of the data block designated by said address based on the content of said process request to maintain cache coherency among the at least two cache systems;

each of said cache systems includes a history table for storing the address received by the cache system and a history table control circuit for controlling said cache control circuit in accordance with the content of said history table, said history table control circuit determines whether the received address is stored in said history table or not, and in response to the presence of the address in said history table, suppresses the accessing of said cache control circuit, and in response to the absence of the address in said history table, conducting the accessing of said cache control circuit.

4. A multi-processor system according to claim 3, wherein said plurality of cache systems share at least one of said main memories through one of a shared bus and an interconnecting network.

5. A multi-processor system according to claim 3 wherein said history table stores at least one of an address of a data block shared by the respective cache data memories and an address at which the designated data block is invalidated in the cache data memory.

6. A multi-processor system according to claim 3, wherein when each of said history control circuits receives said address and said process request, said history control circuit notifies a state of the data block of a corresponding cache data memory to the requesting cache system.

7. A multi-processor system according to claim 3 wherein a memory configuring said history table has a faster operation speed than that of said cache tag memory.

8. A multi-processor system having a plurality of cache systems sharing at least one main memory through an interconnecting network for maintaining data coherency among said cache systems, each of said cache systems sending a cache coherency transaction to said interconnecting network;

said interconnecting network comprising:

a distribution circuit distributing a transaction for each transmission destination cache system to conduct multi-transfer of the received cache coherency transaction to a particular one of said cache systems which needs the maintenance of the coherency;

a history table provided for each of said cache systems for storing at least a portion of the cache coherency transactions; and a control circuit provided for each of said cache systems for referring to said history table for the transaction received from said distribution circuit and suppressing the issuance of the transaction in response to the hit of the received cache coherence transaction in said history table and issuing the transaction to the cache system in response to the miss-hit of the received cache coherency transaction in said history table.

9. A multi-processor system according to claim 8, wherein said history table stores at least one of an address of a data block shared by the respective cache data memories and an address at which the designated data block is invalidated in the cache data memory.

10. A multi-processor system according to claim 8, wherein said history table is implemented by memory elements of faster operation speed than that of said cache tag memory.

11. A multi-processor system according to claim 10, wherein said cache tag memory is implemented by memory elements of faster operation speed than that of said main memory.

12. A multi-processor system according to claim 8, wherein each of said cache system includes a cache data memory, a cache tag memory for storing tags attached to respective data blocks in said cache data memory and consistency information representing consistency of respective data blocks, and a cache control circuit for controlling access to said cache data memory and said cache tag memory.

13. A multi-processor system including at least three processors each having a cache system and a main memory shared by said processors, said cache systems sharing said main memory through a data transmission path, and data coherency being maintained among the cache systems, wherein each of said cache systems sends a cache coherency transaction to said data transmission path, each of said cache systems comprises a cache control circuit including a cache tag memory for maintaining and managing data coherency among the plurality of cache systems, a history table for updatably recording at least a portion of the received cache coherency transaction, and a transaction issuance control circuit for referring to said history table and suppressing the issuance of the transaction to said cache control circuit in response to the hit of the received cache coherency transaction in the record of said history table and issuing the transaction to said cache control circuit in response to the miss-hit of the received cache coherency transaction in the record of said history table.

14. A multi-processor system according to claim 13, wherein said history table is implemented by memory elements of faster operation speed than that of said cache tag memory.

15. A multi-processor system according to claim 14, wherein said cache tag memory is implemented by memory elements of faster operation speed than that of said main memory.

16. A multi-processor system according to claim 13, wherein said data transmission path corresponds to one of a shared bus and an interconnecting network.

17. A multi-processor system according to claim 13, wherein each of said cache system includes a cache data memory, a cache tag memory for storing tags attached to respective data blocks in said cache data memory and consistency information representing consistency of respective data blocks, and a cache control circuit for controlling access to said cache data memory and said cache tag memory.

18. A cache system for maintaining data coherency with different cache systems in a multi-processor system sharing at least one main memory, comprising:

a cache data memory which stores cache data;

a cache tag memory which stores addresses of respective cache data stored in said cache data memory;

a cache controller which controls access to said cache data memory and said cache tag memory; and a coherency transaction history table which records at least a portion of addresses issued from other cache systems; and a history table controller which controls operation of said cache controller to access to said cache data memory and said cache tag memory in accordance with contents of said coherency transaction history table, said history table controller suppressing access to said cache data memory and said cache tag memory, via said cache controller, when an address issued from another cache system is present in said coherency transaction history table, and alternatively facilitating access to said cache data memory and said cache tag memory, via said cache controller, when the address issued from another cache system is absent from said coherent transaction history table.

19. A cache system according to claim 18, wherein said history table is implemented by memory elements of faster operation speed than that of said cache tag memory.

20. A cache system according to claim 19, wherein said cache tag memory is implemented by memory elements of faster operation speed than that of said main memory.

* * * * *